United States Patent
Salter et al.

(10) Patent No.: US 9,487,126 B2
(45) Date of Patent: Nov. 8, 2016

(54) PHOTOLUMINESCENT PUDDLE LAMP

(71) Applicant: Ford Global Technologies, LLC, Dearborn, MI (US)

(72) Inventors: Stuart C. Salter, White Lake, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 14/322,440

(22) Filed: Jul. 2, 2014

(65) Prior Publication Data

US 2015/0138794 A1   May 21, 2015

Related U.S. Application Data

(63) Continuation-in-part of application No. 14/301,635, filed on Jun. 11, 2014, which is a continuation-in-part of application No. 14/156,869, filed on Jan. 16, 2014, which is a continuation-in-part of application No. 14/086,442, filed on Nov. 21, 2013.

(51) Int. Cl.
| | |
|---|---|
| *B60Q 3/02* | (2006.01) |
| *B60Q 1/32* | (2006.01) |
| *B60Q 1/24* | (2006.01) |

(52) U.S. Cl.
CPC .............. *B60Q 1/323* (2013.01); *B60Q 1/24* (2013.01); *B60Q 2400/40* (2013.01)

(58) Field of Classification Search
CPC .......................... B60Q 3/0216; B60Q 3/0226
See application file for complete search history.

(56) References Cited

U.S. PATENT DOCUMENTS

| | | |
|---|---|---|
| 5,709,453 A | 1/1998 | Krent et al. |
| 6,117,362 A | 9/2000 | Yen et al. |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Anabel Ton
(74) *Attorney, Agent, or Firm* — Vichit Chea; Price Heneveld LLP

(57) ABSTRACT

An illumination apparatus for a vehicle is disclosed. The illumination apparatus comprises a photoluminescent portion disposed on a downward facing portion of the vehicle and a light source located proximate the downward facing portion. The light source is configured to emit light at a first wavelength directed toward the photoluminescent portion. In response to receiving the light at the first wavelength, the photoluminescent portion is configured to convert the first wavelength to at least a second wavelength, longer than the first wavelength, to illuminate a surface beneath the vehicle.

17 Claims, 5 Drawing Sheets

(56) References Cited

U.S. PATENT DOCUMENTS

| | | |
|---|---|---|
| 7,264,367 B2 | 9/2007 | Hulse |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,113,695 B2 * | 2/2012 | Meinke ............... B60Q 1/2669 362/214 |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,773,012 B2 | 7/2014 | Ryu et al. |
| 8,846,184 B2 | 9/2014 | Agrawal et al. |
| 8,952,341 B2 | 2/2015 | Kingsley et al. |
| 9,057,021 B2 | 6/2015 | Kingsley et al. |
| 9,065,447 B2 | 6/2015 | Buttolo et al. |
| 9,212,809 B2 * | 12/2015 | Salter ................... B60Q 3/0203 |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0274540 A1 | 12/2006 | Klaver et al. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 * | 12/2013 | Mulder .................... F21V 9/00 362/555 |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 05229385 A | 9/1993 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

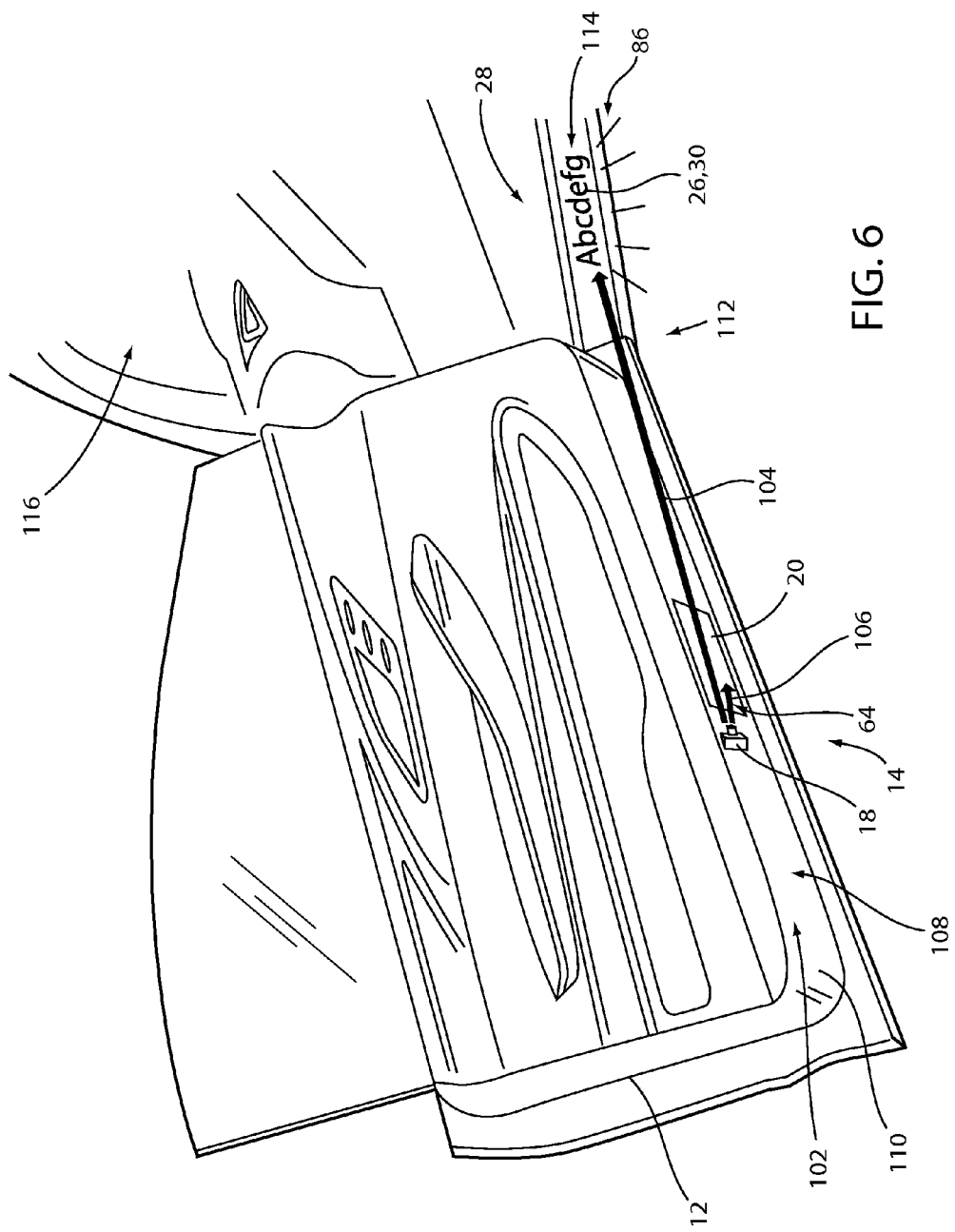

PHOTOLUMINESCENT PUDDLE LAMP

CROSS-REFERENCE TO RELATED APPLICATION

This application is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed on Jan. 16, 2014, entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present disclosure generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present disclosure, an illumination apparatus for a vehicle is disclosed. The illumination apparatus comprises a photoluminescent portion disposed on a substantially downward facing portion of the vehicle and a light source located proximate the downward facing portion. The light source is configured to emit light at a first wavelength directed toward the photoluminescent portion. In response to receiving the light at the first wavelength, the photoluminescent portion is configured to convert the first wavelength to at least a second wavelength, longer than the first wavelength, to illuminate a surface beneath the vehicle.

According to another aspect of the present disclosure, an illumination system for a vehicle is disclosed. The illumination system comprises a first photoluminescent portion disposed on a substantially downward facing portion of the vehicle and a second photoluminescent portion located proximate a door sill. A light source is located proximate the first photoluminescent portion and is configured to emit light at a first wavelength. The photoluminescent portions are configured to convert the first wavelength to at least a second wavelength, longer than the first wavelength, to illuminate the photoluminescent portions.

According to yet another aspect of the present disclosure, a method for illuminating a surface beneath a vehicle is disclosed. The method comprises activating a light source in response to a door being oriented in an open position. The light from the light source is directed at a first wavelength toward a photoluminescent portion disposed on a substantially downward facing portion of the vehicle. The photoluminescent portion converts the light at the first wavelength to a second wavelength and illuminates the surface with the light at the second wavelength.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 6 is a perspective view of a bottom portion of a vehicle having a light source configured to illuminate a step-in portion of the vehicle.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system for a vehicle configured to illuminate a portion of a surface beneath a vehicle. In some implementations, a light source may be utilized to illuminate both the surface beneath the vehicle and a logo, emblem, text, decal, badge, or any other form of illuminated portion proximate a step-in or entry portion of the vehicle. The light source may be configured to emit light at a first wavelength or primary emission to excite a photoluminescent structure. The photoluminescent structure may be configured to convert the first wavelength of the light or the primary emission into a second wavelength or secondary emission. The first wavelength of the light may correspond to a first color of light and the second wavelength may correspond to a second color of light, different from the first color. While the various implementations of the lighting system described herein refer to specific structures demonstrated in reference to at least one automotive vehicle, it will be appreciated that the vehicle lighting system may be utilized in a variety of applications.

Figure 1:
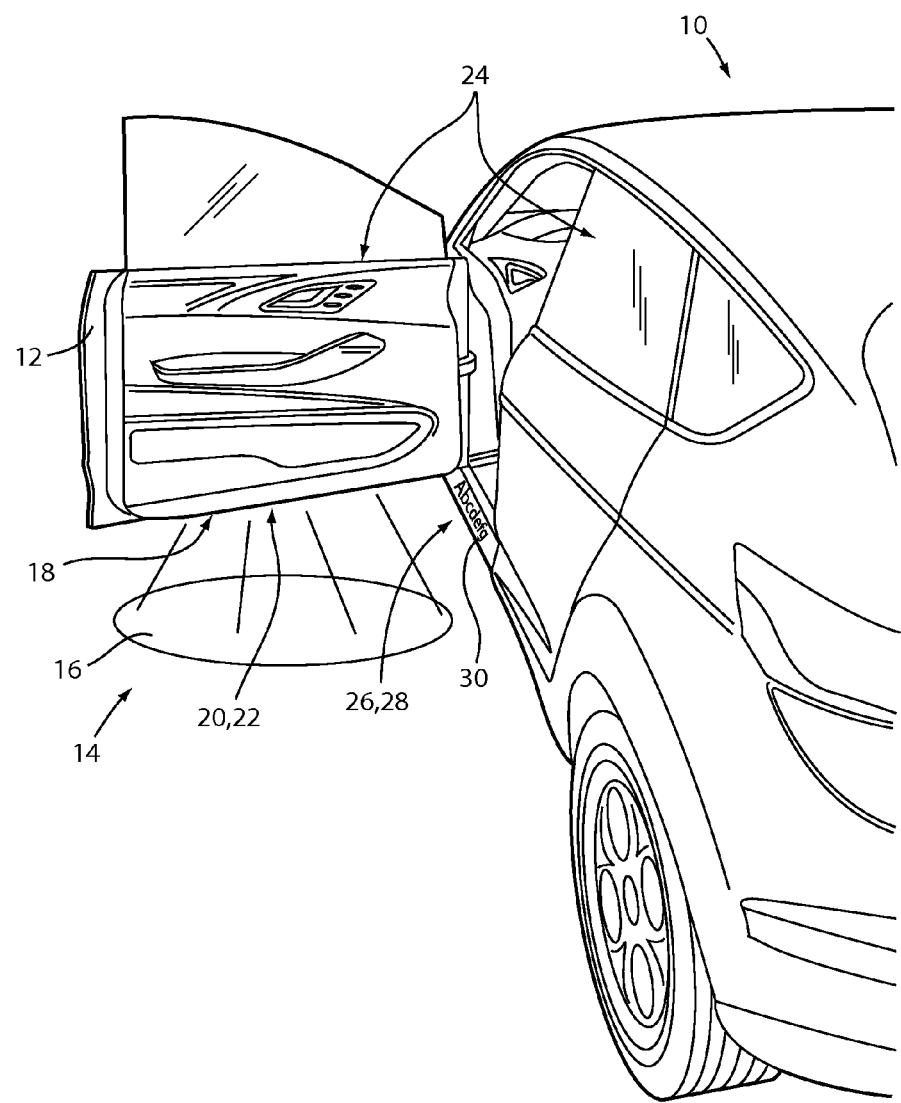
FIG. 1 is a perspective view of an automotive vehicle demonstrating a lighting system.

Referring to FIG. 1, a vehicle 10 is shown having a passenger door 12 shown in an open position. The vehicle 10 is equipped with a lighting system 14 configured to illuminate at least a portion of a surface 16 located beneath the vehicle 10. The lighting system 14 comprises a light source 18 that may be controlled by one or more lighting modules incorporated in the vehicle 10. For example, a lighting module of the vehicle 10 may be configured to selectively activate the light source 18 in response to the passenger door 12 being oriented in the open position.

The light source 18 is configured to emit light at a first wavelength. A first photoluminescent portion 20 is disposed proximate a lower portion 22 of the passenger door 12 and may similarly be utilized in any of a plurality of passenger doors 24 of the vehicle 10. The first photoluminescent portion 20 is configured to convert the first wavelength of the light emitted from the light source 18 to a second wavelength. The second wavelength of the light may correspond to at least one wavelength having a longer wavelength or spectral emission than the first wavelength.

The first wavelength may correspond to a primary emission having a deep blue color. The deep blue colored light may have a peak wavelength of approximately less than 500 nm. The second wavelength may correspond to one or more wavelengths of light corresponding to a secondary emission having at least one wavelength greater than the first wavelength. In this configuration, the light emitted from the light source 18 at the first wavelength is configured to excite the first photoluminescent portion 20. In response to the excitation caused by the light at the first wavelength, the first photoluminescent portion 20 is configured to emit the secondary emission to illuminate the surface 16 beneath the vehicle 10.

In some implementations, the light source 18 is further configured to illuminate a second photoluminescent portion 26. The second photoluminescent portion 26 is disposed proximate a step-in portion 28 or entry portion of the vehicle 10. In various implementations of the disclosed subject matter, the second photoluminescent portion 26 may comprise a logo, emblem, text, decal, badge, and/or any other form of illuminated portion proximate the step-in portion 28. In an exemplary implementation, the second photoluminescent portion 26 comprises a graphic 30, design, marking and/or text configured to illuminate to generate a tertiary emission.

The tertiary emission may be emitted from the second photoluminescent portion 26 at the second wavelength similar to the first photoluminescent portion 20, and in some implementations, may correspond to a third wavelength. The third wavelength may correspond to a different color of light than the first wavelength and the second wavelength. In this configuration, the graphic 30 may illuminate in a color of light different from the color emitted from the light source 18 and the color emitted from the first photoluminescent portion 20. As such, the lighting system 14 provides for various lighting and color arrangements.

The light emitted from the light source 18 at the first wavelength of light may correspond to a color of light that is less perceptible by the human eye compared to the second wavelength and the third wavelength. In this advantageous configuration, the first emission of the light emitted from the light source 18 at the first wavelength may be projected toward the second photoluminescent portion 26 without being visibly obvious to an operator and/or passenger entering the vehicle 10. This configuration may provide for the secondary emission and the tertiary emission to be activated by the light source 18 being projected from a single location. In this way, the lighting system 14 is configured to provide lighting, ambient lighting, accent lighting, or any other form of lighting from a limited number of light sources. By limiting the number of light sources required to provide the lighting discussed herein, the disclosure provides for a cost-effective method for providing lighting for the vehicle 10. For clarity, the primary, secondary, and tertiary emissions may also be referred to herein as a first, second, and third emission respectively.

Figure 2A:
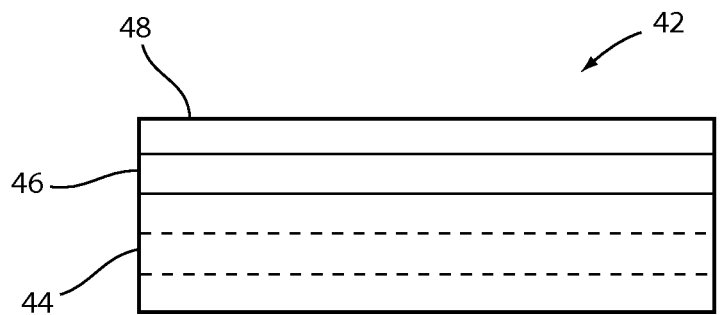
FIG. 2A illustrates a photoluminescent structure rendered as a coating.
Figure 2B:
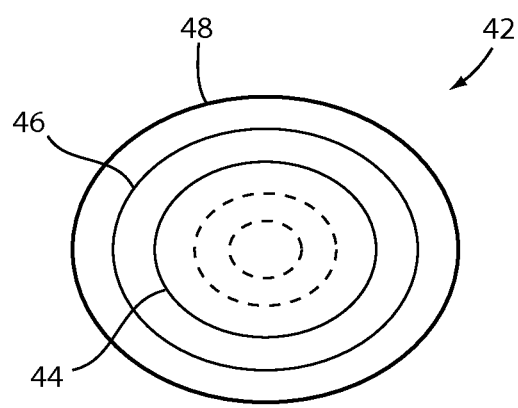
FIG. 2B illustrates the photoluminescent structure rendered as a discrete particle.
Figure 2C:
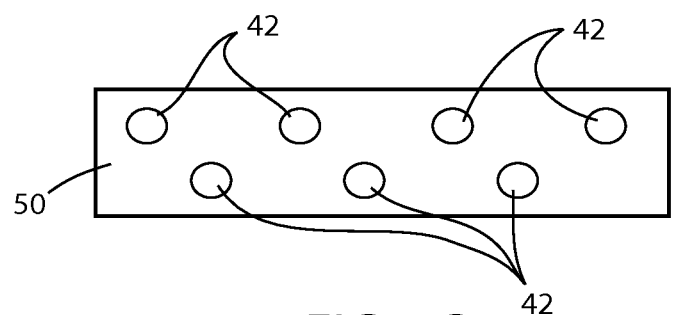
FIG. 2C illustrates a plurality photoluminescent structures rendered as discrete particles and incorporated into a separate structure.

Referring to FIGS. 2A-2C, a photoluminescent structure 42 is generally shown rendered as a coating (e.g. a film) capable of being applied to a vehicle fixture, a discrete particle capable of being implanted in a vehicle fixture, and a plurality of discrete particles incorporated into a separate structure capable of being applied to a vehicle fixture, respectively. The photoluminescent structure 42 may correspond to the photoluminescent portions as discussed herein, for example the first photoluminescent portion 20 and the second photoluminescent portion 26. At the most basic level, the photoluminescent structure 42 includes an energy conversion layer 44 that may be provided as a single layer or a multilayer structure, as shown through broken lines in FIGS. 2A and 2B.

The energy conversion layer 44 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation utilized in the conversion process.

Each of the photoluminescent portions may comprise at least one photoluminescent structure 42 comprising an energy conversion layer (e.g. conversion layer 44). The energy conversion layer 44 may be prepared by dispersing the photoluminescent material in a polymer matrix 50 to form a homogenous mixture using a variety of methods. Such methods may include preparing the energy conversion layer 44 from a formulation in a liquid carrier medium and coating the energy conversion layer 44 to a desired planar and/or non-planar substrate of a vehicle fixture. The energy conversion layer 44 coating may be deposited on a vehicle fixture by painting, screen printing, spraying, slot coating, dip coating, roller coating, and bar coating. Additionally, the energy conversion layer 44 may be prepared by methods that do not use a liquid carrier medium.

For example, a solid state solution (homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multi-layered energy conversion layers 44 may be implanted into a vehicle fixture or panel. When the energy conversion layer 44 includes a multilayer formulation, each layer may be sequentially coated. Additionally, the layers can be separately prepared and later laminated or embossed together to form an integral layer. The layers may also be coextruded to prepare an integrated multi-layered energy conversion structure.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protection layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a chosen vehicle fixture.

In some implementations, the photoluminescent structure 42 may be incorporated into a vehicle fixture as one or more discrete multilayered particles as shown in FIG. 2C. The photoluminescent structure 42 may also be provided as one or more discrete multilayered particles dispersed in a polymer formulation that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
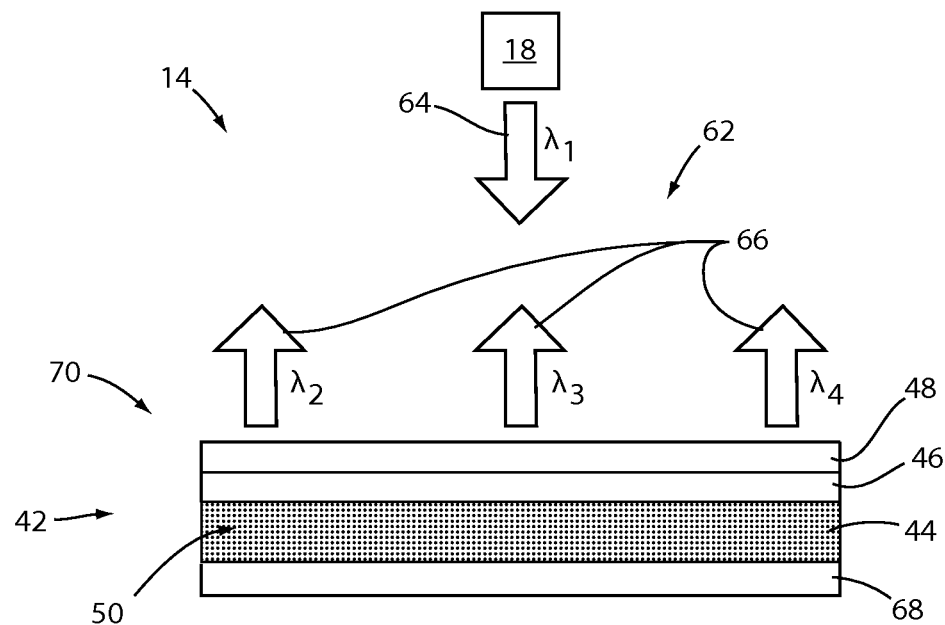
FIG. 3 illustrates a vehicle lighting system configured to convert a first emission of light to a second emission.

Referring to FIG. 3, the lighting system 14 is generally shown according to a front-lit configuration 62 to convert a first emission 64 from the light source 18 to a second emission 66. The first emission 64 comprises a first wavelength $\lambda_1$, and the second emission 66 comprises a second wavelength $\lambda_2$. The lighting system 14 may include a photoluminescent structure 42 rendered as a coating and applied to a substrate 68 of a vehicle fixture 70. The photoluminescent structure 42 may include an energy conversion layer 44, and in some implementations may include the stability layer 46 and/or the protective layer 48. In response to the light source being activated, the first emission 64 is converted from the first wavelength $\lambda_1$ to the second emission 66 having at least the second wavelength $\lambda_2$. The second emission 66 may comprise a plurality of wavelengths $\lambda_2, \lambda_3, \lambda_4$ configured to emit significantly white light from the vehicle fixture 70.

In various implementations, the lighting system 14 comprises at least one energy conversion layer 44 configured to convert the first emission 64 at the first wavelength $\lambda_1$ to the second emission 66 having at least the second wavelength $\lambda_2$. In order to generate the plurality of wavelengths $\lambda_2, \lambda_3, \lambda_4$, the energy conversion layer 44 may comprise a red-emitting photoluminescent material, a green-emitting photoluminescent material, and a blue-emitting photoluminescent material dispersed in the polymer matrix 50. The red, green, and blue-emitting photoluminescent materials may be combined to generate the significantly white light for the second emission 66. Further, the red, green, and blue-emitting photoluminescent materials may be utilized in a variety of proportions and combinations to control the output color of the second emission 66.

Each of the photoluminescent materials may vary in output intensity, output wavelength, and peak absorption wavelengths based on a particular photochemical structure and combinations of photochemical structures utilized in the energy conversion layer 44. As an example, the second emission 66 may be changed by adjusting the wavelength of the first emission $\lambda_1$ to activate the photoluminescent materials at different intensities to alter the color of the second emission 66. In addition to, or alternatively to the red, green, and blue-emitting photoluminescent materials, other photoluminescent materials may be utilized alone and in various combinations to generate the second emission 66 in a wide variety of colors. In this way, the lighting system 14 may be configured for a variety of applications to provide a desired lighting color and effect for the vehicle 10.

The light source 18 may also be referred to as an excitation source and is operable to emit at least the first emission 64. The light source 18 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 64. The first emission from the light source 18 may be configured such that the first wavelength $\lambda_1$ corresponds to at least one absorption wavelength of the one or more photoluminescent materials of the energy conversion layer 44. In response to receiving the light at the first wavelength $\lambda_1$, the energy conversion layer 44 may be excited and output the one or more output wavelengths $\lambda_2, \lambda_3, \lambda_4$. The first emission 64 provides an excitation source for the energy conversion layer 44 by targeting absorption wavelengths of the various photoluminescent materials utilized therein. As such, the lighting system 14 is configured to output the second emission 66 to generate a desired light intensity and color.

Though the plurality to wavelengths is referred to as the wavelengths $\lambda_2, \lambda_3, \lambda_4$, the photoluminescent materials may be combined in various proportions, types, layers, etc. to generate a desired appearance for the second emission 66. The photoluminescent materials may also be utilized in a plurality of energy conversion layers distributed along a path of the first emission 64 to generate any number of emissions, for example a third emission, a fourth emission, etc. The third emission may be emitted from the second photoluminescent portion 26 and the fourth emission may be emitted from a third photoluminescent portion disposed on the vehicle 10.

In an exemplary implementation, the light source 18 comprises an LED configured to emit the first wavelength $\lambda_1$ which corresponds to a blue spectral color range. The blue spectral color range comprises a range of wavelengths generally expressed as blue light (~440-500 nm). In some implementations, the first wavelength $\lambda_1$ may also comprise wavelengths in a near ultraviolet color range (~390-450 nm). In an exemplary implementation, $\lambda_1$ may be approximately equal to 470 nm. In some implementations, the first wavelength $\lambda_1$ may be approximately less than 500 nm such that the first wavelength of the light is not significantly visible.

The blue spectral color range and shorter wavelengths may be utilized as an excitation source for the lighting system 14 due to these wavelengths having limited perceptual acuity in the visible spectrum of the human eye. By utilizing shorter wavelengths for the first wavelength $\lambda_1$, and converting the first wavelength with the conversion layer 44 to at least one longer wavelength, the lighting system 14 creates a visual effect of light originating from the photoluminescent structure 42. In this configuration, light is emitted from the photoluminescent structure 42 (e.g. the first photoluminescent portion 20, the second photoluminescent portion 26) from locations of the vehicle 10 that may be inaccessible or costly to add conventional light sources requiring electrical connections.

As discussed herein, each of the plurality of wavelengths $\lambda_2$, $\lambda_3$, $\lambda_4$ may correspond to a significantly different spectral color range. The second wavelength $\lambda_2$ may correspond to the excitation of a red-emitting photoluminescent material having a wavelength of approximately 620-750 nm. The third wavelength $\lambda_3$ may correspond to the excitation of a green emitting photoluminescent material having a wavelength of approximately 526-606 nm. The fourth wavelength $\lambda_4$ may correspond to a blue or blue green emitting photo luminescent material having a wavelength longer than the first wavelength $\lambda_1$ and approximately 430-525 nm. Though the wavelengths $\lambda_2$, $\lambda_3$, $\lambda_4$ are discussed herein as being utilized to generate a significantly white light, various combinations of photoluminescent materials may be utilized in the conversion layer 44 to convert the first wavelength $\lambda_1$ to one or more wavelengths corresponding to a variety of colors.

Figure 4:
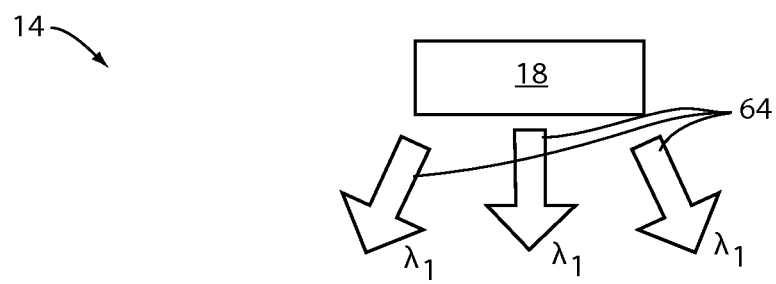
FIG. 4 illustrates the vehicle lighting system configured to convert a first emission of light to a plurality of emissions of light.
Figure 4:
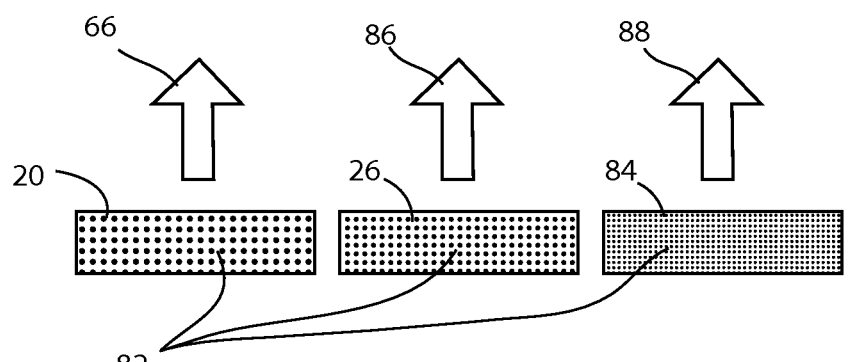

Referring to FIG. 4, the light system 14 is shown in a front-lit configuration. In an exemplary implementation, the light source 18 may be configured to emit the first emission 64 toward a plurality of photoluminescent portions 82. In this example, the plurality of photoluminescent portions 82 comprises the first photoluminescent portion 20, the second photoluminescent portion 26, and a third photoluminescent portion 84. Each of the photoluminescent portions 20, 26, 84 may be configured to convert the first wavelength $\lambda_1$ of the first emission 64 to one or more of the plurality of wavelengths $\lambda_2$, $\lambda_3$, $\lambda_4$. In this way, the first emission 64 may be converted into a plurality of emissions originating from each of the photoluminescent portions 82 to generate a multicolored lighting effect.

For example, the first photoluminescent portion 20 may comprise photoluminescent materials in a conversion layer configured to generate the second emission 66. The second photoluminescent portion 26 may comprise photoluminescent materials in a conversion layer configured to generate a third emission 86. The third photoluminescent portion 84 may comprise photoluminescent materials in a conversion layer configured to generate a fourth emission 88. Similar to the energy conversion layer 44, discussed in reference to FIG. 3, photoluminescent materials configured to emit light of various colors may be utilized in a variety of proportions and combinations to control the output color of each of the second emission 66, the third emission 86, and the fourth emission 88. Based on a desired lighting effect, each of the emissions 66, 86, 88 may comprise photoluminescent material configured to emit light having substantially similar colors, or a wide variety of color combinations.

To achieve the various colors and combinations of photoluminescent materials described herein, the lighting system 14 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are included herein by reference in their entirety.

Figure 5:
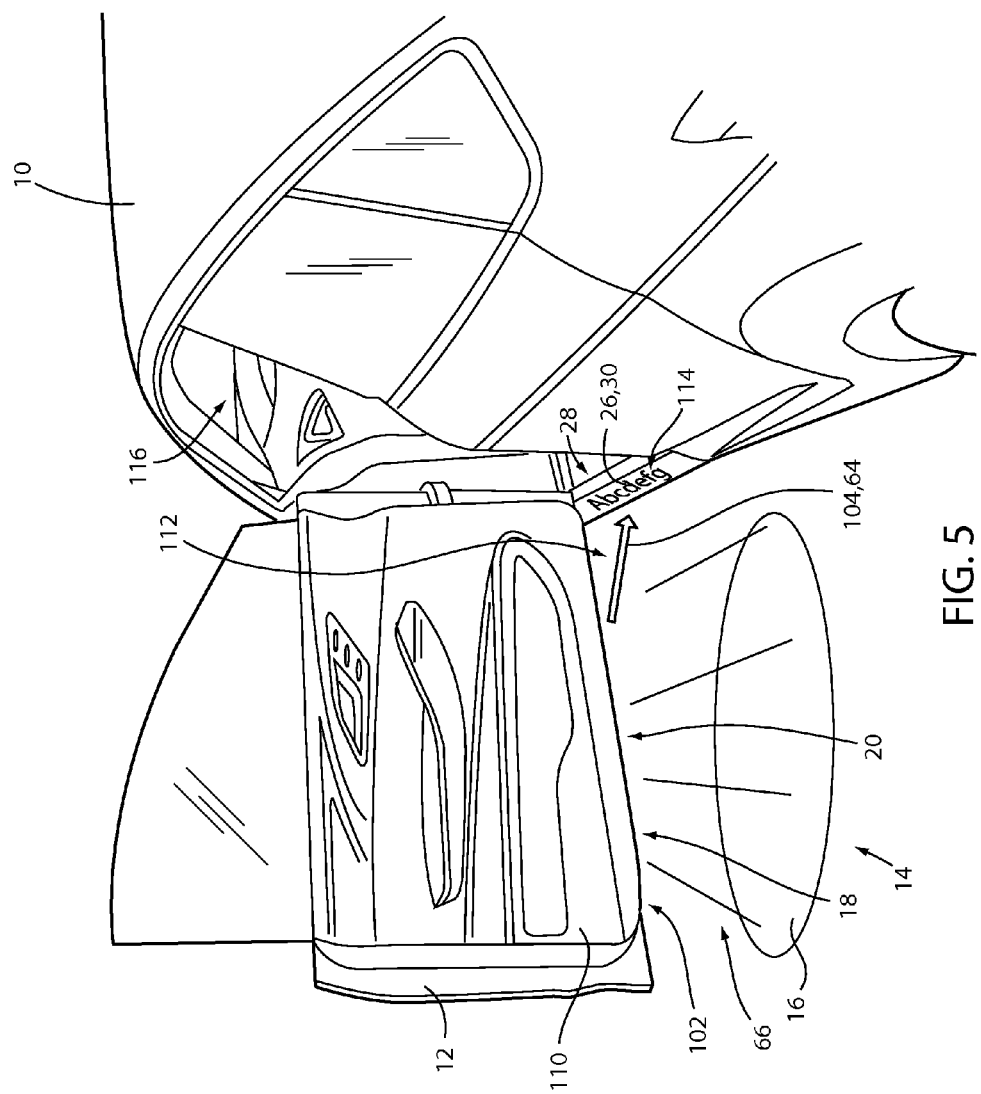
FIG. 5 is a perspective view of a vehicle having a light source configured to illuminate a portion of a surface beneath the vehicle.

Referring to FIGS. 5 and 6, the lighting system 14 is shown having the first photoluminescent portion 20 disposed on a bottom portion 102 of the passenger door 12. In this exemplary configuration, the light source 18 is configured to emit the first emission 64 along the bottom portion 102 of the passenger door 12 such that when the door is oriented in the open position, the first emission 64 is directed toward the step-in portion 28 along arrows 104 and 106. The light source 18 is further configured to emit the first emission 64 along the bottom portion 102 of the passenger door 12 such that the light at the first wavelength $\lambda_1$ is directed along a substantially downward facing portion 108 of a door trim panel 110. In some implementations, the light source 18 may be mounted to or disposed in the door trim panel 110 to emit the first emission 64 along the arrows 104, 106.

The light source 18 is controlled by one or more lighting modules incorporated in the vehicle 10 and may be selectively activated in response to the passenger door 12 being oriented in the open position. In the open position, the first emission 64 is directed along the arrows 104, 106 to illuminate the first photoluminescent portion 20 and the second photoluminescent portion 26 in light at the first wavelength $\lambda_1$. In response to receiving the light at the first wavelength $\lambda_1$, the conversion layer 44 of each of the first photoluminescent portion 20 and the second photoluminescent portion 26 is excited such that the first wavelength is converted to at least one longer wavelength. In this configuration, the lighting system 14 is configured to emit the first emission 64 and corresponding light at the first wavelength $\lambda_1$ through a significantly open volumetric space 112 proximate the vehicle 10 extending from the passenger door 12 to the step-in portion.

The first photoluminescent portion 20 is disposed on the downward facing portion 108 of the door trim panel 110. In response to the excitation of the conversion layer 44 to the first wavelength $\lambda_1$, the first photoluminescent portion 20 is configured to emit the second emission 66 toward the surface 16 beneath the passenger door 12 of the vehicle 10. The second photoluminescent portion 26 is disposed proximate the step-in portion 28. In some implementations, the second photoluminescent portion 26 may be disposed in a body trim panel 114 extending along a base portion or door sill of a door opening 116 of the passenger door 12. In response to the excitation of the conversion layer 44 to the first wavelength $\lambda_1$, the second photoluminescent portion 26 is configured to emit the third emission 86. The third emission 86 may be directed outward from the step-in portion 28 such that the third emission 86 is visible to an occupant entering the vehicle 10.

The second emission 66 from the first photoluminescent portion 20 may be configured to emit substantially white light having a plurality of wavelengths as discussed in reference to FIG. 3. Further, in some implementations the second emission 66 may emit light at a variety of wavelengths corresponding to any color of light. In an exemplary implementation, the substantially white light emitted from the first photoluminescent portion 20 may provide illumination of the surface 16 beneath the vehicle 10. In this configuration, the first photoluminescent portion 20 may be configured to provide a puddle light or ground light to illuminate the surface 16 of the ground proximate the door opening 116. As a puddle lamp, the photoluminescent portion 20 may be configured to illuminate a region on the ground proximate the door opening 116 to provide access lighting to the vehicle 10. The close proximity of the light source 18 to the first photoluminescent portion 20 may provide for the second emission 66 to generate a high intensity light to clearly illuminate the surface 16.

The third emission 86 from the second photoluminescent portion 26 may be configured to emit substantially white light or colored light as discussed in reference to FIG. 4. In an exemplary implementation, the second photoluminescent portion 26 comprises the graphic 30. The graphic 30 may comprise any logo, emblem, text, decal, badge, form, etc. The third emission 86 is configured to illuminate the graphic 30 in an ambient glow that may be of a lower intensity than the second emission 66 due to an increased distance of the second photoluminescent portion 26 to the light source 18 relative to the first photoluminescent portion 20. In this configuration, the second photoluminescent portion 26 is configured to illuminate the graphic 30 to provide illuminated details to accent the appearance of the vehicle 10.

In some implementations, the third photoluminescent portion 84 may further be disposed on the vehicle 10 proximate the arrows 104, 106. In response to receiving the first emission 64, the third photoluminescent portion 84 may be configured to emit the fourth emission 88 as substantially white light or light of any color. In some implementations, the fourth emission 88 may be configured to emit a different color of light than the second emission 66 and/or the third emission 86. The fourth emission 88 may be disposed proximate the second photoluminescent portion 26 and provide further accent lighting to complement the graphic 30 corresponding to the third emission 86. Based on a desired lighting effect, each of the emissions 66, 86, 88 may comprise photoluminescent materials configured to emit light having substantially similar colors, or a wide variety of color combinations.

The lighting system 14 as described herein may provide various benefits including a cost-effective system operable to provide decorative ambient lighting as well as functional lighting of the surface 16 beneath the vehicle 10. The various implementations described herein including the particular locations and configurations of each of the photoluminescent portions may vary without departing from the spirit of the disclosure. The subject matter of the instant disclosure provides various lighting systems and methods that may improve the appearance of a vehicle and improve vehicle safety by illuminating a surface beneath the vehicle proximate a passenger door.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An illumination apparatus for a vehicle comprising:
   a photoluminescent portion disposed on a substantially downward facing portion of a vehicle door trim panel; and
   a light source located proximate the downward facing portion and configured to emit light at a first wavelength directed toward the photoluminescent portion, wherein the photoluminescent portion is configured to convert the first wavelength to at least a second wavelength longer than the first wavelength to illuminate a surface beneath the vehicle.

2. The illumination apparatus according to claim 1, wherein the light source is disposed in a bottom portion of the vehicle door trim panel.

3. The illumination apparatus according to claim 1, further comprising:
   a second photoluminescent portion disposed proximate a door sill of a vehicle.

4. The illumination apparatus according to claim 3, wherein the light source is further configured to direct the light at the first wavelength toward the door sill to illuminate the second photoluminescent portion.

5. The illumination apparatus according to claim 3, wherein the second photoluminescent portion is configured to convert the first wavelength to a third wavelength having a different color than the second wavelength.

6. The illumination apparatus according to claim 3, wherein the second photoluminescent portion comprises a logo configured to convert the first wavelength to the second wavelength.

7. An illumination system for a vehicle comprising:
   a first photoluminescent portion disposed on a substantially downward facing portion of a door of the vehicle;
   a second photoluminescent portion located proximate a door sill; and
   a light source located proximate the first photoluminescent portion configured to emit light at a first wavelength, wherein the photoluminescent portions are configured to convert the first wavelength to at least a second wavelength longer than the first wavelength to illuminate the photoluminescent portions.

8. The illumination system according to claim 7, wherein the first photoluminescent portion is configured to illuminate a surface beneath the vehicle with the second wavelength of the light.

9. The illumination system according to claim 7, wherein the light source is configured to direct the light at the first wavelength toward the first photoluminescent portion and the second photoluminescent portion when the door is oriented in an open position.

10. The illumination system according to claim 7, wherein the portion of the door comprises a door trim panel.

11. The illumination system according to claim 10, wherein the first photoluminescent portion and the light source are each disposed in a bottom portion of the door trim panel.

12. The illumination apparatus according to claim 7, wherein the second photoluminescent portion is configured to convert the first wavelength to a third wavelength having a different color than the second wavelength.

13. A method for illuminating a surface beneath a vehicle comprising:
   activating a light source in response to a door being oriented in an open position;
   directing light at a first wavelength from the light source toward a photoluminescent portion disposed on a substantially downward facing portion of the vehicle;
   converting light at the first wavelength to a second wavelength with the photoluminescent portion; and
   illuminating the surface with the light at the second wavelength.

14. The method according to claim 13, further comprising:
   emitting the light at the second wavelength from the photoluminescent portion toward the surface.

15. The method according to claim 14, wherein the light at the first wavelength and the light at the second wavelength are emitted from a bottom portion of a door trim panel.

16. The method according to claim 13, further comprising:
   directing the light at the first wavelength toward a door sill portion to illuminate a second photoluminescent portion.

17. The method according to claim 16, further comprising:
   converting the light at the first wavelength to a third wavelength with the second photoluminescent portion, the third wavelength corresponding to a different color than the second wavelength.

* * * * *